(12) United States Patent
Hoelen et al.

(10) Patent No.: US 7,588,363 B2
(45) Date of Patent: Sep. 15, 2009

(54) ILLUMINAT SYSTEM

(75) Inventors: Christoph Gerard August Hoelen, Eindhoven (NL); Johannes Petrus Maria Ansems, Eindhoven (NL); Denis Joseph Carel Van Oers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 483 days.

(21) Appl. No.: 11/570,907

(22) PCT Filed: Jun. 23, 2005

(86) PCT No.: PCT/IB2005/052063

§ 371 (c)(1), (2), (4) Date: Dec. 19, 2006

(87) PCT Pub. No.: WO2006/003559

PCT Pub. Date: Jan. 12, 2006

(65) Prior Publication Data

US 2008/0310151 A1    Dec. 18, 2008

(30) Foreign Application Priority Data

Jun. 29, 2004    (EP) .................................. 04103040

(51) Int. Cl.
F21S 13/00    (2006.01)
(52) U.S. Cl. .................. 362/612; 362/249.02; 362/244
(58) Field of Classification Search ................ 362/231, 362/240, 249.01, 249.02, 244, 555, 612
See application file for complete search history.

(56) References Cited

U.S. PATENT DOCUMENTS

| 5,477,436 | A | 12/1995 | Bertling et al. |
| 6,295,104 | B1 | 9/2001 | Egawa et al. |
| 6,471,371 | B1 * | 10/2002 | Kawashima et al. ........ 362/235 |
| 6,857,767 | B2 * | 2/2005 | Matsui et al. ............... 362/373 |
| 6,923,548 | B2 * | 8/2005 | Lim .......................... 362/612 |
| 7,320,531 | B2 * | 1/2008 | West et al. .................. 362/231 |
| 7,385,574 | B1 * | 6/2008 | Van de Ven et al. ........... 345/82 |
| 2002/0141174 | A1 | 10/2002 | Parker et al. |

(Continued)

FOREIGN PATENT DOCUMENTS

DE    19945495    4/2001

(Continued)

Primary Examiner—Stephen F. Husar
Assistant Examiner—Peggy A. Neils

(57) ABSTRACT

An illumination system has linear array of light emitters (R, G, B, A, W) associated with it least one linear array of outcoupling means ($O_1, O_2, O_3, \ldots$) for coupling light out of the illumination system. Each linear array of outcoupling means is arranged parallel to the linear array of light emitters. For each linear array of outcoupling means, a configuration of the outcoupling means and a configuration of the light emitters fulfill the requirement: $N_{CU} \times N_{LC} = N_{OU} \times N_{LO}$, wherein $N_{CU}$ is the number of clusters ($C_1, C_2, C_3, \ldots$) per unit ($U_1, \ldots$), $N_{LC}$ is the number of light emitters in each of the clusters, $N_{OU}$ is the number of outcoupling means per unit, $N_{LO}$ is the number of light emitters per outcoupling means. A "cluster" is the smallest repetitive collection of light emitters forming the linear array of light emitters. A "unit" is the smallest number of adjacent clusters repetitive with respect to the outcoupling means and with respect to the light emitters.

17 Claims, 20 Drawing Sheets

U.S. PATENT DOCUMENTS

Figure 1A:
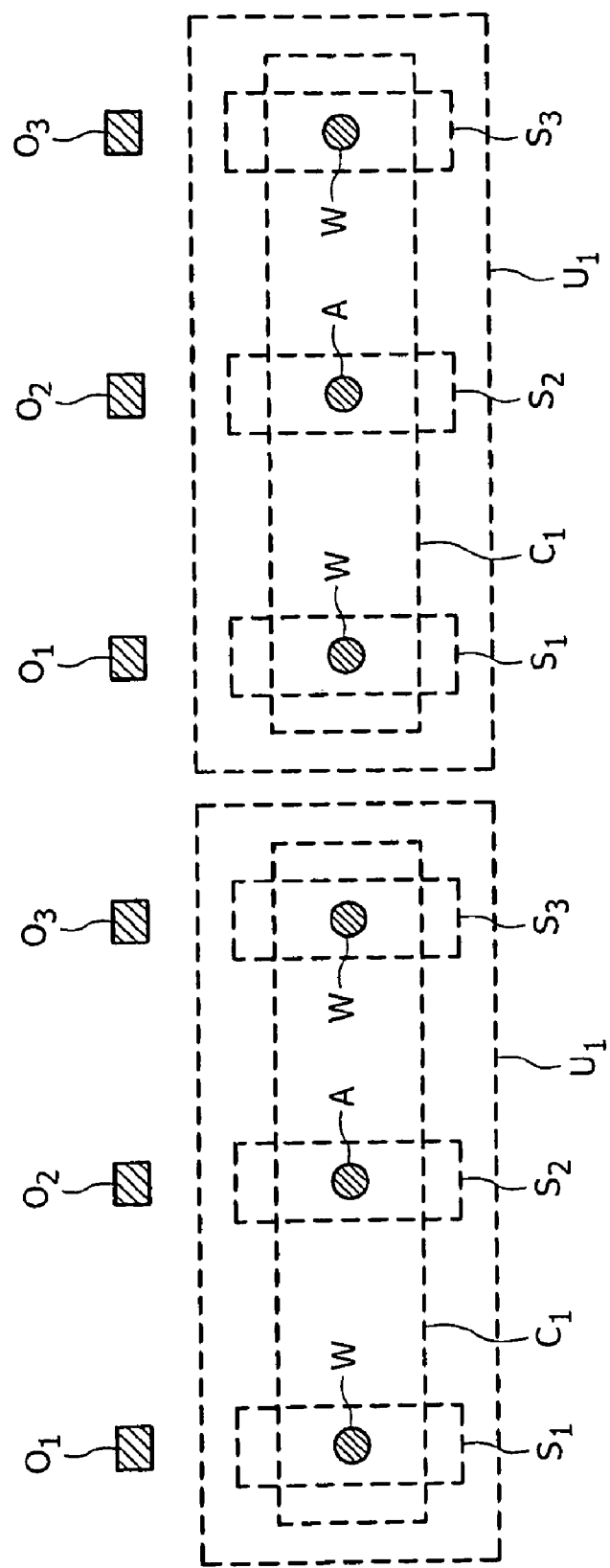
Figure 1A:
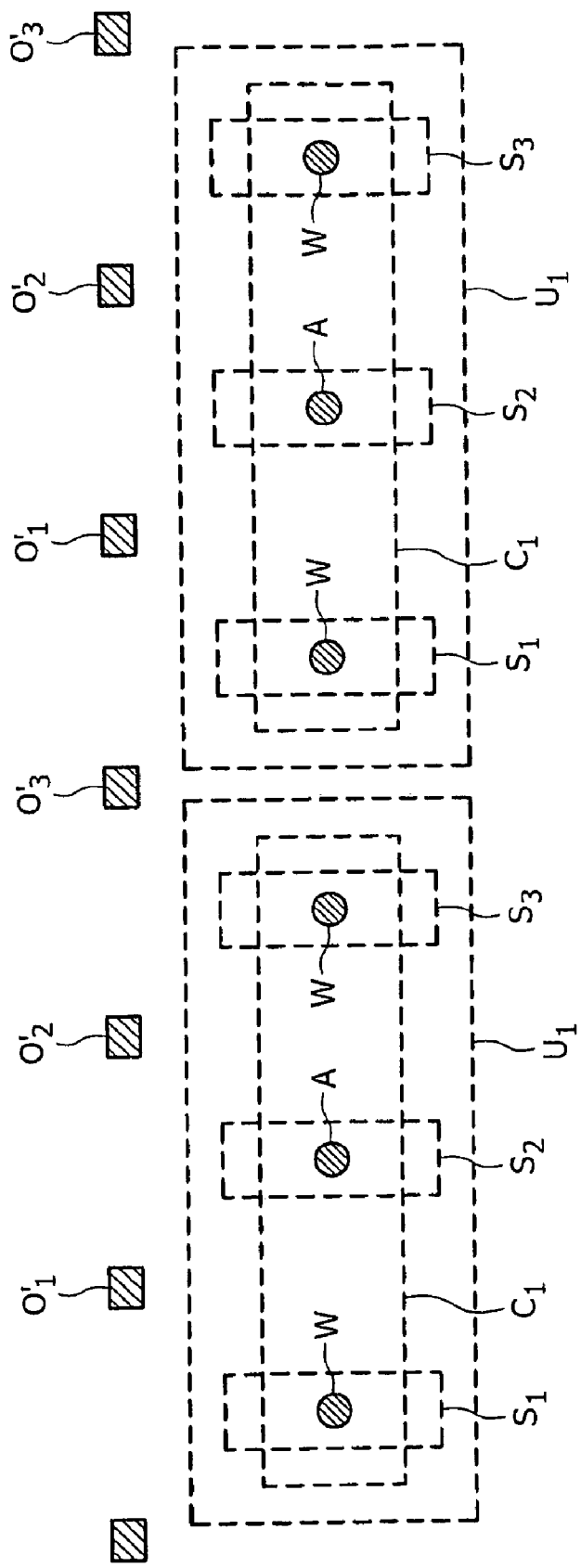

2002/0167016 A1  11/2002  Hoelen et al.

FOREIGN PATENT DOCUMENTS

| DE | 10009783 | 9/2001 |
|---|---|---|
| EP | 0819884 | 1/1998 |
| EP | 0881426 | 12/1998 |
| EP | 1055872 A1 | 11/2000 |
| JP | 2002221723 | 8/2002 |
| JP | 2002228844 | 8/2002 |
| WO | 0188430 | 11/2001 |
| WO | 02075440 | 9/2002 |

* cited by examiner

ILLUMINAT SYSTEM

The invention relates to an illumination system comprising a linear array of light emitters associated with at least one linear array of outcoupling means for coupling light emitted by the light emitters out of the illumination system, each linear array of outcoupling means being arranged parallel to the linear array of light emitters.

Such illumination systems are known per se. They are used, inter alia, as backlighting of (image) display devices, for example for television receivers and monitors. Such illumination systems can particularly suitably be used as a backlight for non-emissive displays, such as liquid crystal display devices, also referred to as LCD panels, which are used in (portable) computers or (cordless) telephones. In addition, such illumination systems are used for general lighting purposes, such as flood lights and for large-area direct-view light emitting panels such as applied, for instance, in signage, contour lighting, and billboards. In addition, the illumination system can be used as a so-called light pipe creating thin luminaires or lamps.

In addition, such illumination systems comprise a plurality of light emitters such as, for instance, light-emitting diodes (LEDs). LEDs can be light emitters of distinct primary colors, such as, for example the well-known red, green, or blue light emitters. In addition, the light emitter can have, for example, amber or cyan as primary color. These primary colors may be either generated directly by the light-emitting-diode chip, or may be generated by a phosphor upon irradiance with radiation from the light-emitting-diode chip. In the latter case, also mixed colors or white light is possible as one of the primary colors. Generally, the light emitted by the light emitters is mixed to obtain a uniform distribution of the light while eliminating the correlation of the light emitted by the illumination system to a specific light emitter. In addition, it is known to employ a controller with a sensor and some feedback algorithm in order to obtain high color accuracy.

In such illumination systems light, generally, propagates according to the well-known principle of total internal reflection (TIR). Light emitted by the light emitters is coupled out from of the illumination system by locally disturbing or eliminating the condition of total internal reflection. As an example, (partly) reflecting surfaces can be used to couple out light from the illumination system and generate a light beam. When using light emitters of distinct primary colors, for instance LEDs, in an illumination system with specularly reflecting surfaces, for instance in the form of slits, grooves, or (repetitive) optical micro structures such as, e.g., micro lenses or prisms, a dynamic color-effect and/or dynamic brightness-effect can be created with an illumination system being essentially transparent.

The relative positions of all the light emitters and of all the outcoupling means become important if not a sort of diffusing structures are employed for coupling out the light from the illumination system. A non-uniform intensity profile (with respect to color uniformity as well as to total flux) is obtained for such an illumination system resulting in color breakup and/or illuminance non-uniformities at a plane to be illuminated by the illumination system.

The invention has for its object to eliminate the above disadvantage wholly or partly. According to the invention, this object is achieved by an illumination system comprising:

a linear array of light emitters associated with at least one linear array of outcoupling means for coupling light emitted by the light emitters out of the illumination system, each linear array of outcoupling means being arranged parallel to the linear array of light emitters, for each linear array of outcoupling means, a configuration of the outcoupling means and a configuration of the light emitters fulfilling the requirement:

$$N_{CU} \times N_{LC} = N_{OU} \times N_{LO},$$

wherein:
$N_{CU}$ is a number of clusters per unit,
$N_{LC}$ is a number of light emitters in each of the clusters,
$N_{OU}$ is a number of outcoupling means per unit,
$N_{LO}$ is a number of light emitters per outcoupling means, wherein:
a "cluster" is a smallest repetitive collection of light emitters forming the linear array of light emitters;
each cluster comprises a plurality of light emitters of at least a first primary color and a second primary color, the second primary color being distinct from the first primary color, and
a "unit" is a smallest number of adjacent clusters repetitive with respect to the outcoupling means in the at least one linear array of outcoupling means and with respect to the light emitters.

According to the measure of the invention, a substantially uniform intensity profile with respect to color uniformity and total flux is obtained for an illumination system in which the product of the number $N_{LU}$ of clusters per unit and the number $N_{LC}$ of light emitters in each of the clusters equals the product of the number $N_{OU}$ of outcoupling means per unit and the number $N_{LO}$ of light emitters per outcoupling means.

The basic idea behind the invention described in the present patent application is that a pre-determined configuration of out-coupling means that appears to be identical for all the individual light emitters, or that appears to "as average" identical for each primary color, eventually results in intensity distributions for each of the primary colors being substantially the same.

Many solutions for uniformity-enhancing configurations of the outcoupling means in relation to the configuration of the light emitters are obtained when the requirements as described in this invention are fulfilled. These requirements are generally applicable, i.e., they are valid for all kinds of outcoupling structures such as slits, holographic, diffractive or any other outcoupling means. Preferably, the outcoupling means are patterned (at least in the direction parallel to the light sources). Preferably, the outcoupling means are non-scattering. Preferably, the outcoupling means reflect predominantly specularly or exhibit a so-called non-Lambertian reflection.

The uniformity of the intensity profile with respect to color uniformity and flux distribution is further improved when within a unit the number of light sources per color is a multiple of the number of light sources in a predetermined set of adjacent light emitters. To this end, a preferred embodiment of the illumination system according to the invention is characterized in that, for each linear array of outcoupling means, the number $N_{LCU}$ of light emitters of the same primary color in each unit fulfils the requirement:

$$N_{LCU} = i \times N_{LO}, \text{ with } i \in [1, 2, 3, \dots],$$

wherein a "set" is a collection of $N_{LO}$ adjacent light emitters with $$N_{LO} = N_{LU}/N_{OU},$$

and $$N_{LU} = N_{LC} \times N_{CU}.$$

The uniformity of the intensity profile with respect to color uniformity and flux distribution is further improved by confining the distribution of the light sources of the same primary color in each cluster. To this end, a preferred embodiment of the illumination system according to the invention is characterized in that the light emitters of the same primary color in each cluster are distributed on average equally over all available positions in the set. In this manner the light sources of the same primary color within a cluster are equally at all the positions available within such a set that the cluster is composed of.

The build-up of the illumination system is further simplified by making the distribution of the light emitters more symmetric. To this end, a preferred embodiment of the illumination system according to the invention is characterized in that the pitch between the light emitters is constant.

Preferably, each outcoupling means comprises a continuous structure. The build-up of the illumination system is further simplified by making the distribution of the outcoupling means more symmetric. To this end, a preferred embodiment of the illumination system according to the invention is characterized in that the pitch between the outcoupling means is constant.

Preferably, each outcoupling means is symmetrical with respect to a center of the outcoupling means. Preferably, the centre of each outcoupling means is aligned with a centre of each corresponding set of $N_{LO}$ light emitters. Preferably, the centre of each outcoupling means is aligned between centers of two adjacent sets of $N_{LO}$ light emitters.

A number of preferred configurations is obtained with the measure according to the invention if each unit comprises only one cluster. To this end, a preferred embodiment of the illumination system according to the invention is characterized in that each unit consists of a single cluster and each cluster comprises an even number of light emitters and is associated with an even number of outcoupling means, and wherein:

$$N_{LCC}=i \times j \times N_{LO}, i \in [1, 2, 3, \ldots ),$$

where:
j=1 in case $N_{LO}$ is even, and
j=2 in case $N_{LO}$ is odd.

An alternative embodiment of the illumination system according to the invention is characterized in that each unit consists of a single cluster and each cluster comprises an odd number of light emitters and is associated with an odd number of outcoupling means, and wherein:

$$N_{LCC}=[(2 \times i)+j] \times N_{LO}, i \in [0, 1, 2, \ldots ),$$

where:
j=1 for one of the primary colors, and
j=0 for the other primary colors.

An alternative number of preferred configurations is obtained with the measure according to the invention if each unit comprises at least two clusters. To this end, a preferred embodiment of the illumination system according to the invention is characterized in that each unit consists of at least two clusters.

An outcoupling structure may be a continuous structure or it may be composed of a pre-determined number of discrete sub-structures. In the latter case, the sub-structures can have different pitches and sizes. Preferably, the sub-structures have a symmetrical configuration with respect to the centre of the outcoupling structure.

An preferred embodiment of the illumination system according to the invention is characterized in that each cluster comprises at least one light emitter of a third primary color, the third primary color being distinct from the first and the second primary color. Preferably, the light emitters in each cluster are arranged symmetrical with respect to the distribution of the primary colors.

The uniformity of the intensity profile with respect to color uniformity and total flux is further improved when the linear array of light sources is embedded between reflecting surfaces. To this end, a preferred embodiment of the illumination system according to the invention is characterized in that sides of the linear array of light emitters are oriented substantially perpendicular with respect to the linear array of light emitters and are specularly reflective. The reflective sides create virtual light emitters thereby enhancing the uniformity of the light emitted by the illumination system.

These and other aspects of the invention are apparent from and will be elucidated with reference to the embodiments described hereinafter.

Figure 1B:
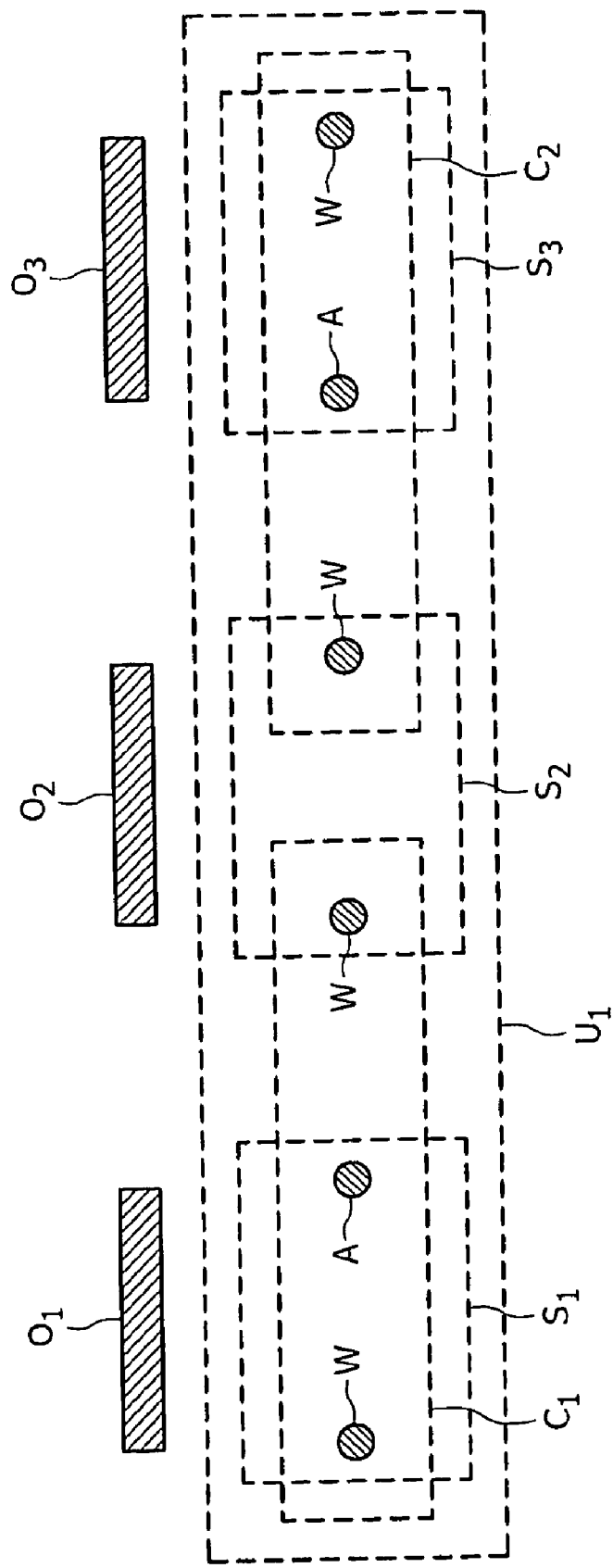
Figure 1B:
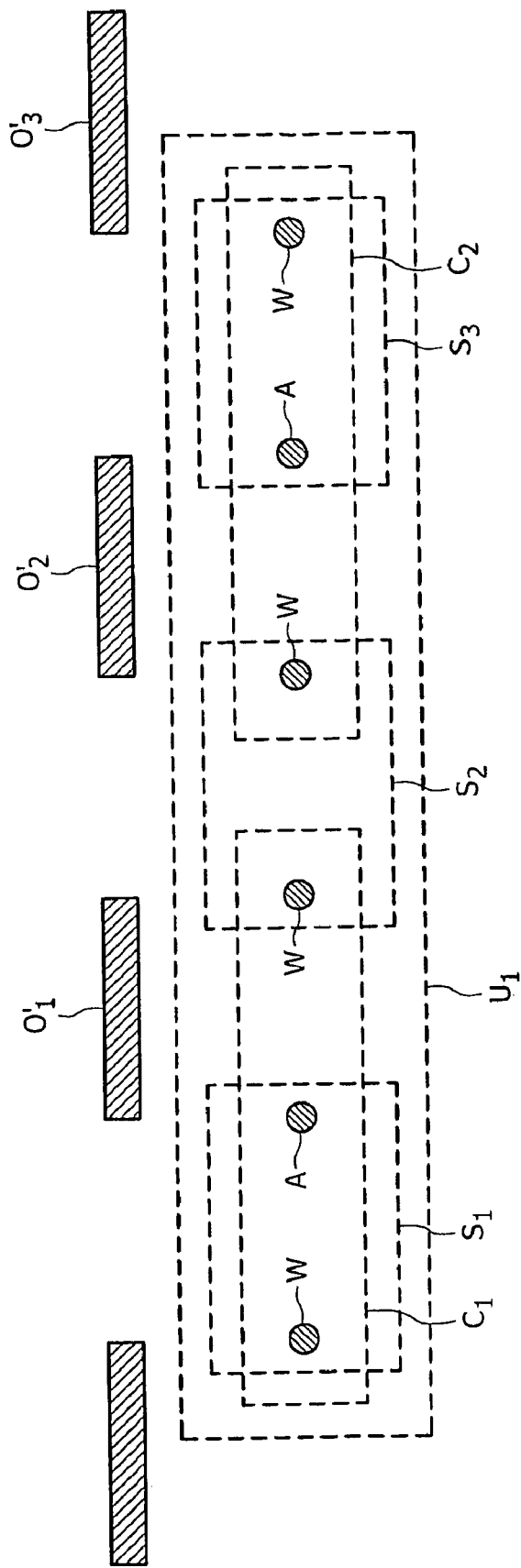
Figure 1C:
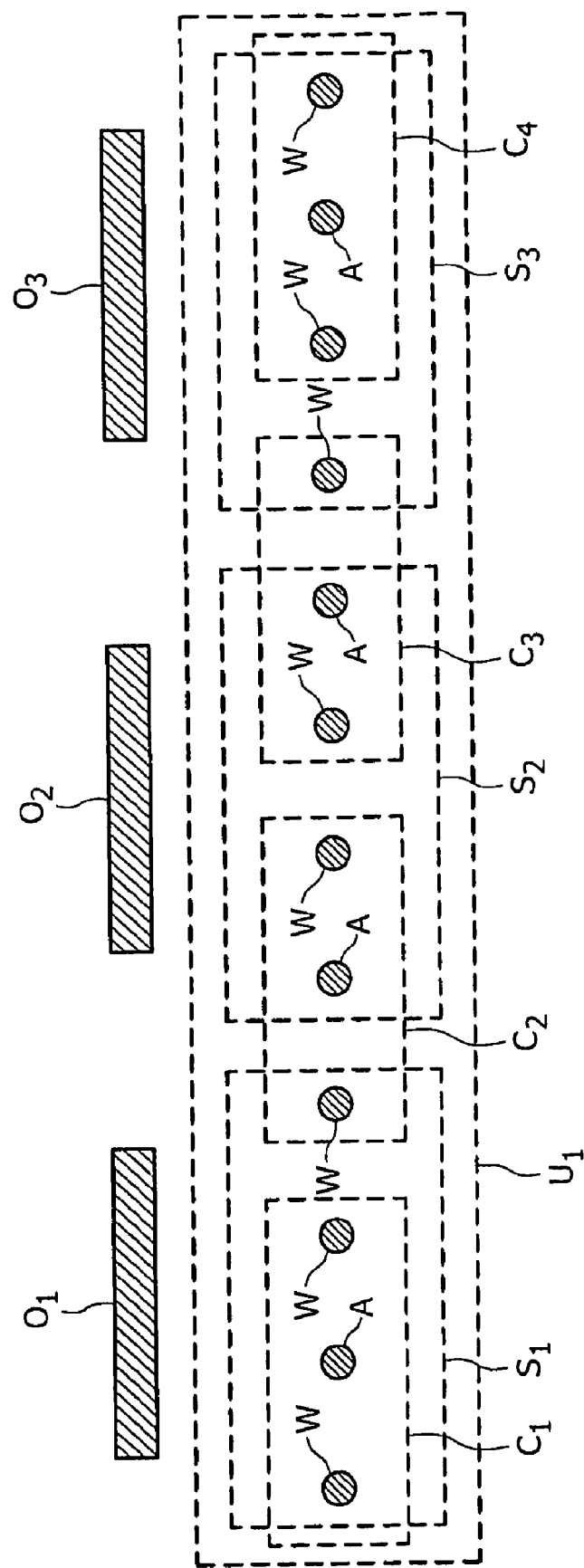
Figure 1C:
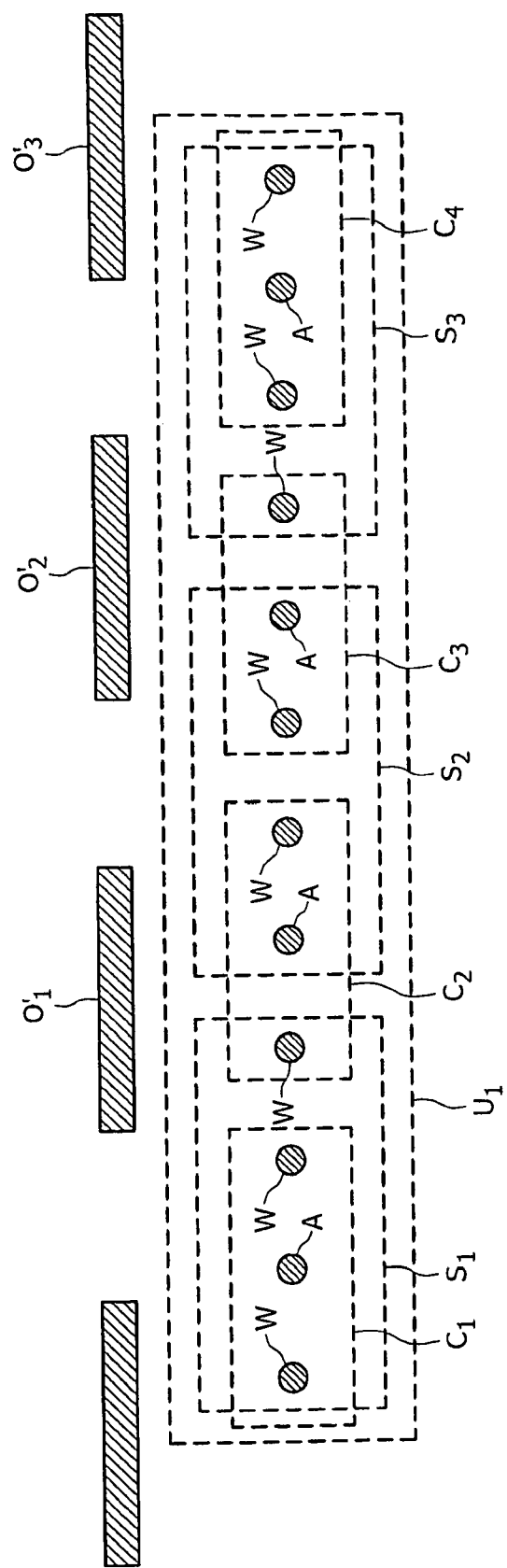
Figure 1D:
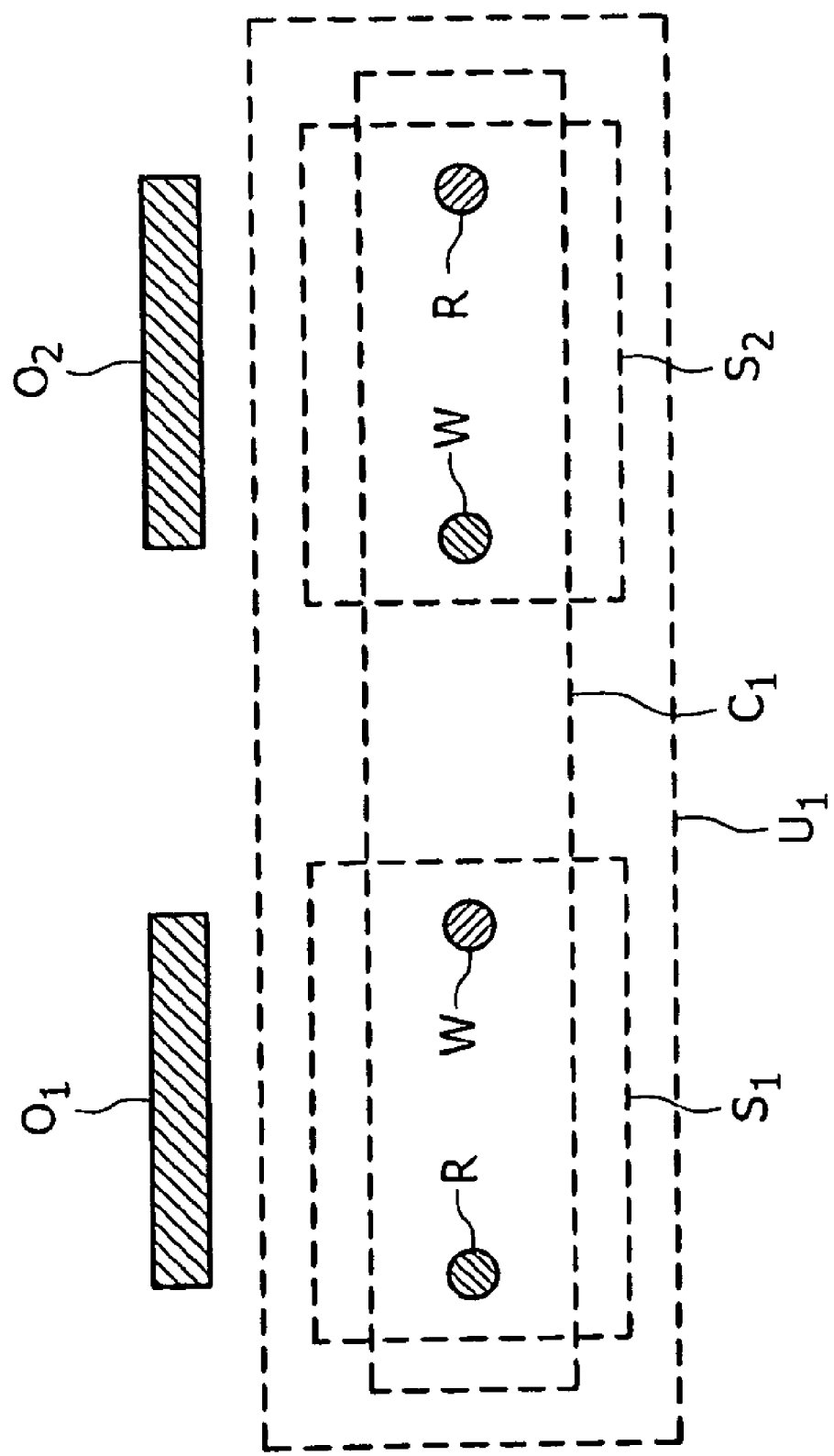
Figure 1D:
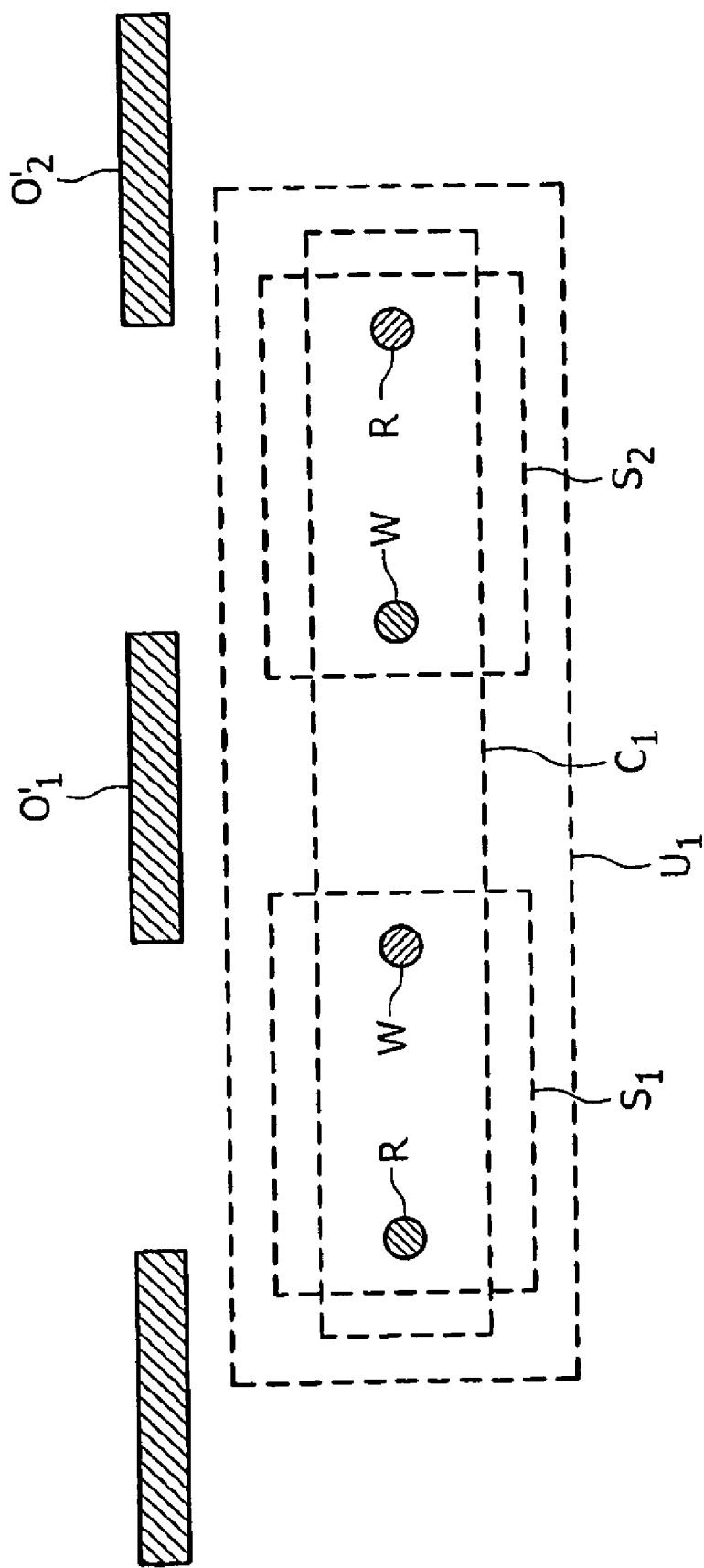
Figure 1E:
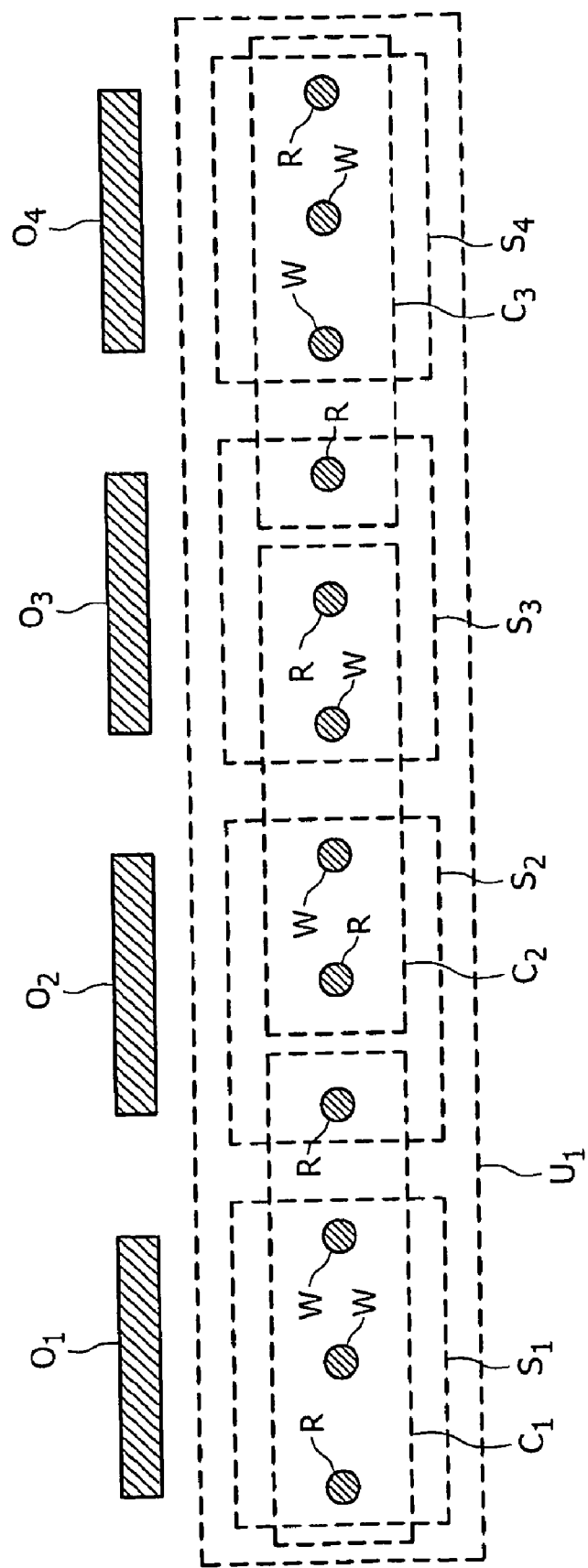
Figure 1E:
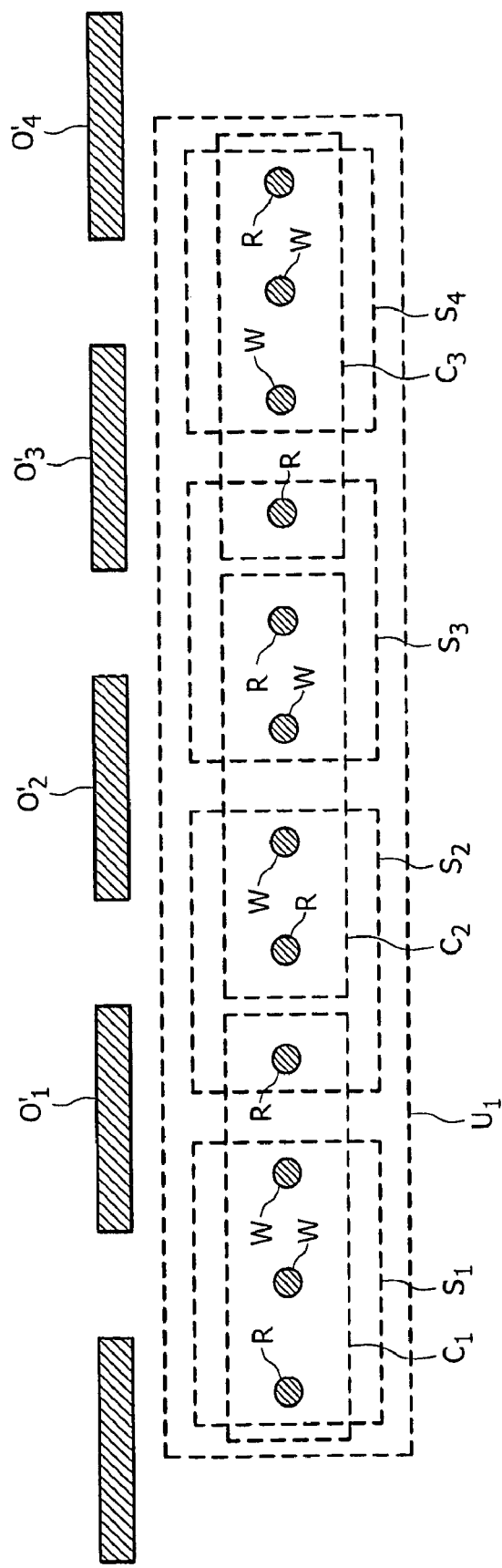
Figure 1F:
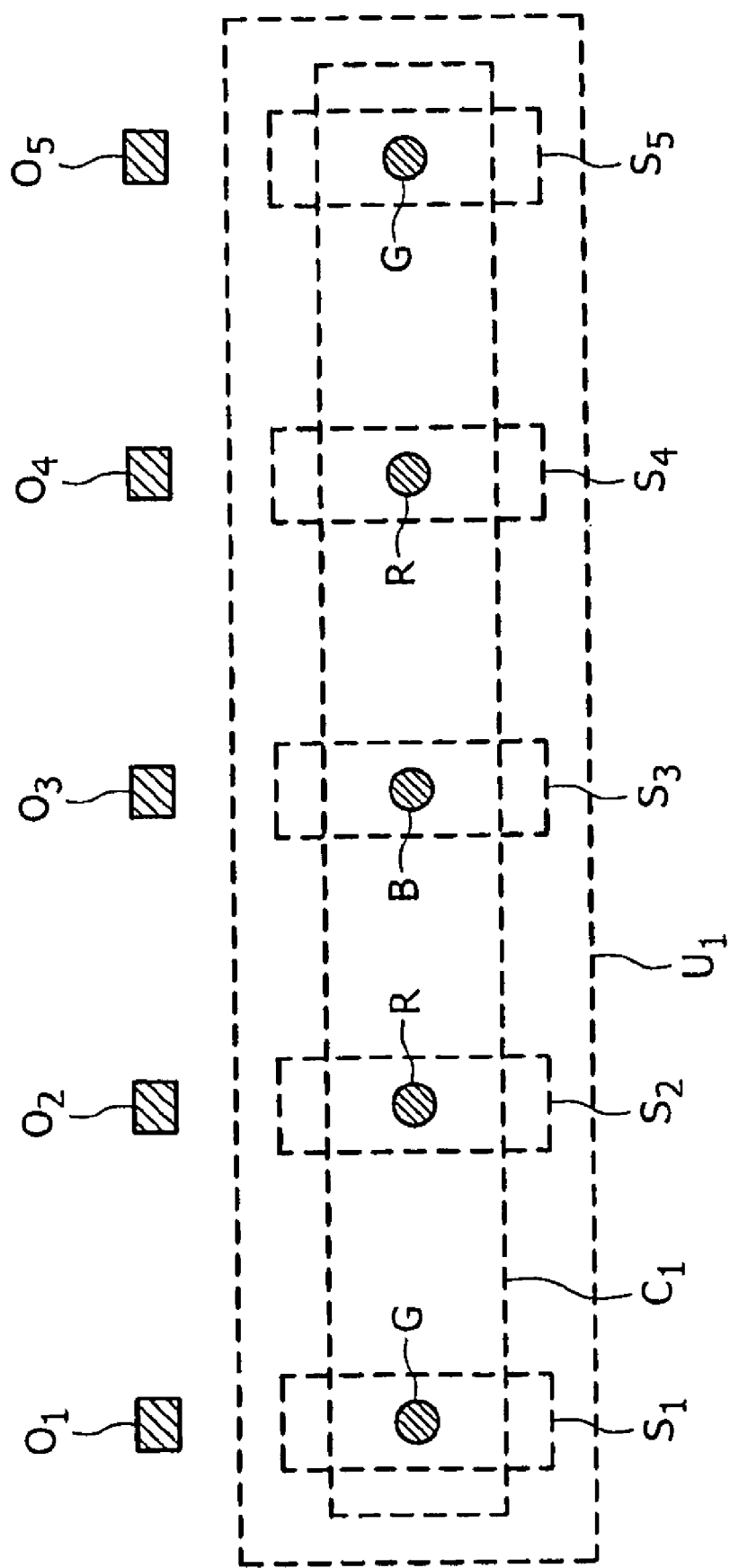
Figure 1G:
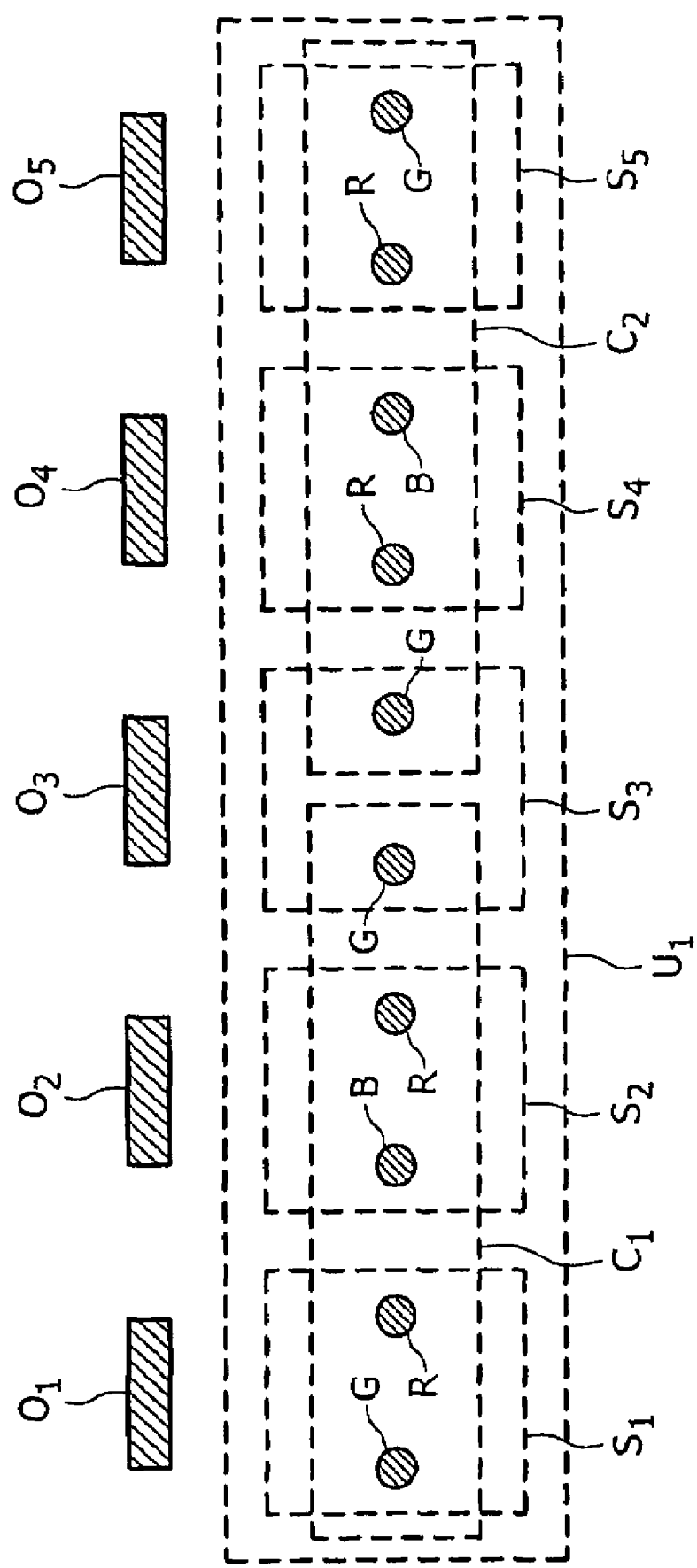
Figure 1H:
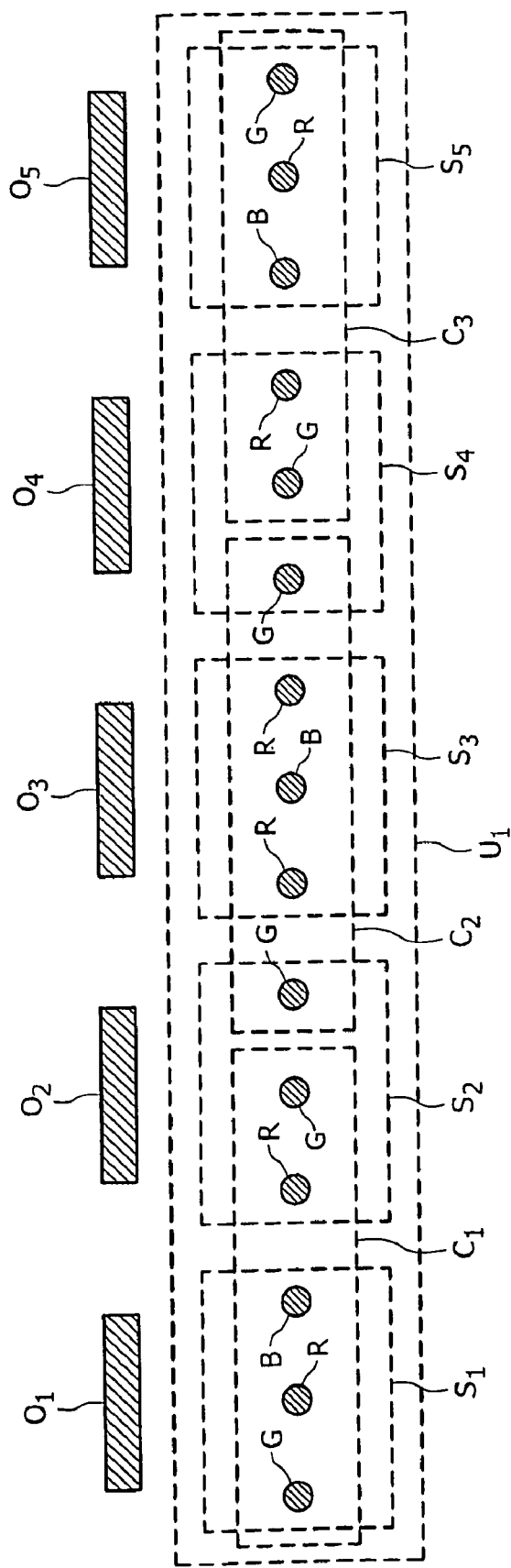
Figure 1I:
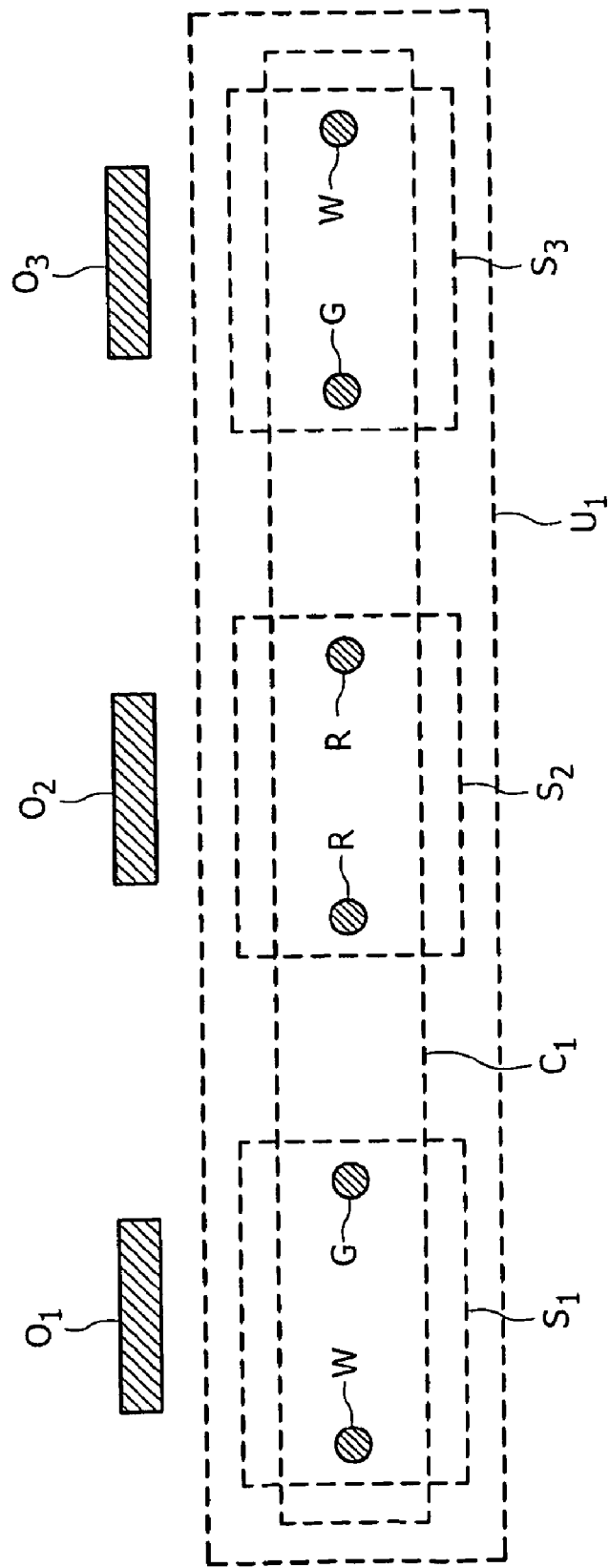
Figure 1J:
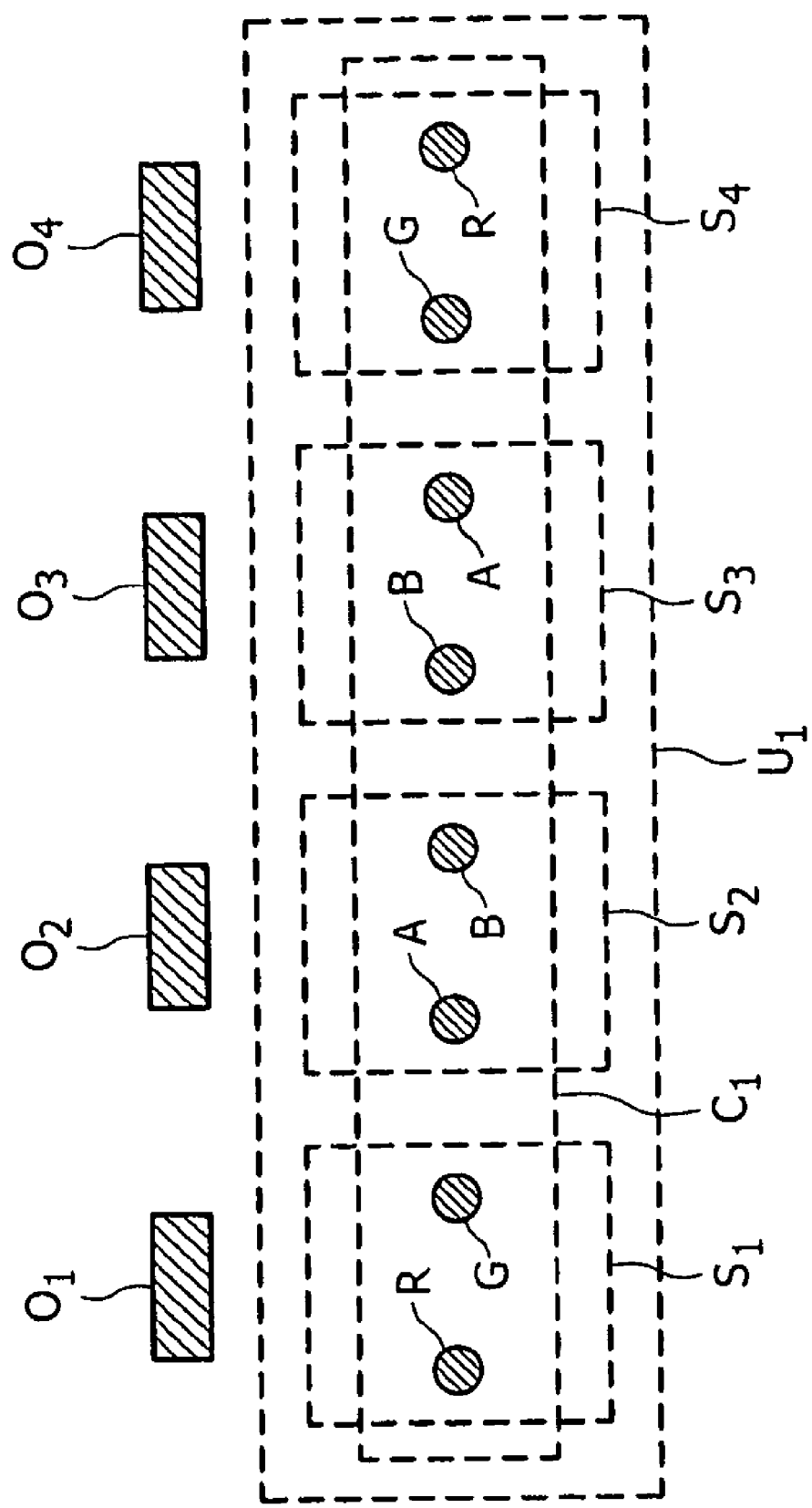
Figure 1K:
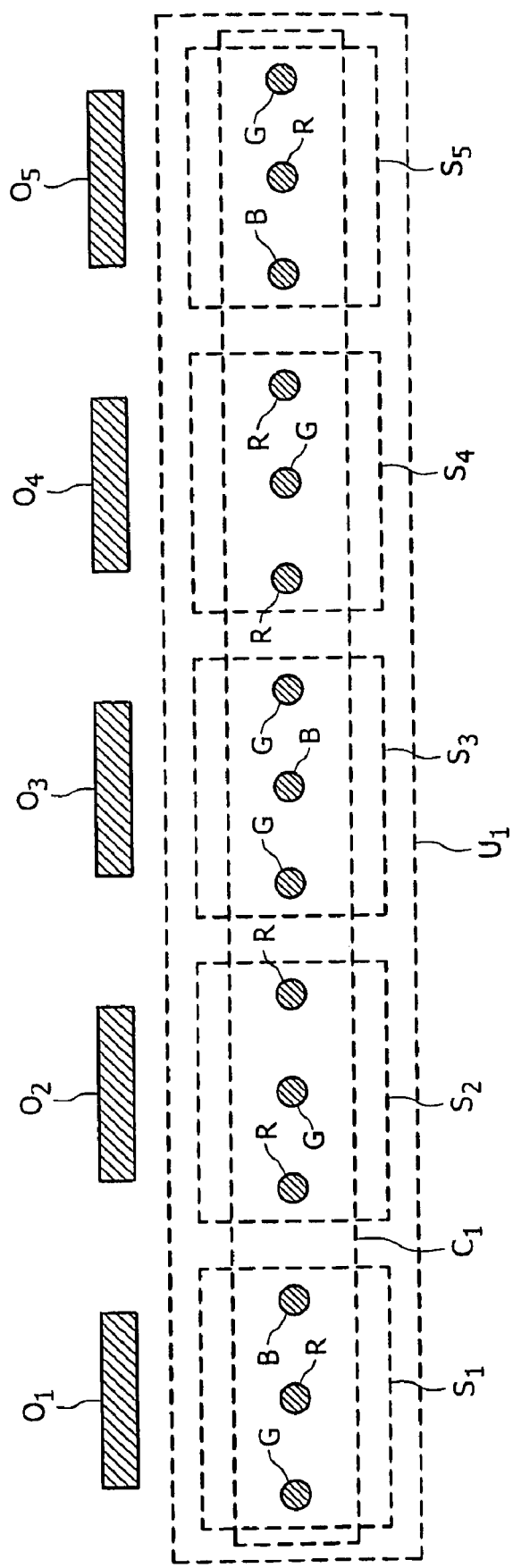
Figure 1L:
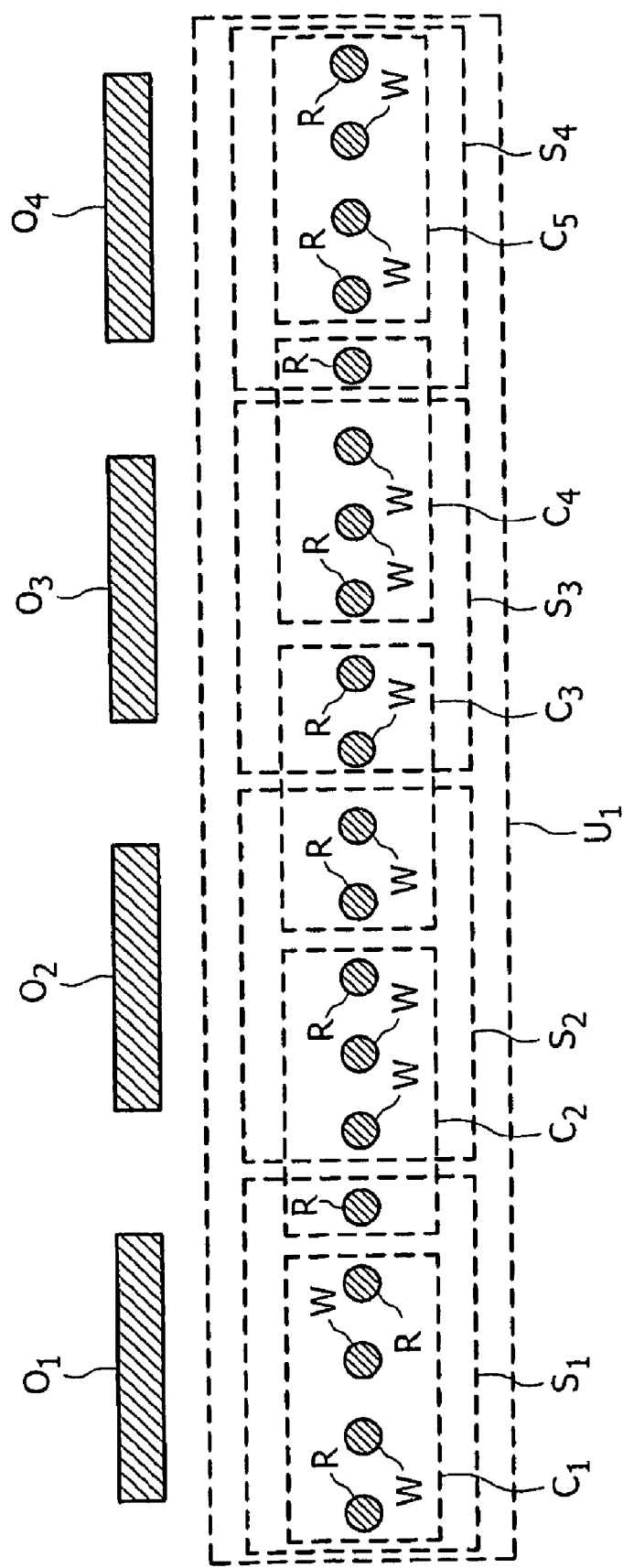
Figure 1M:
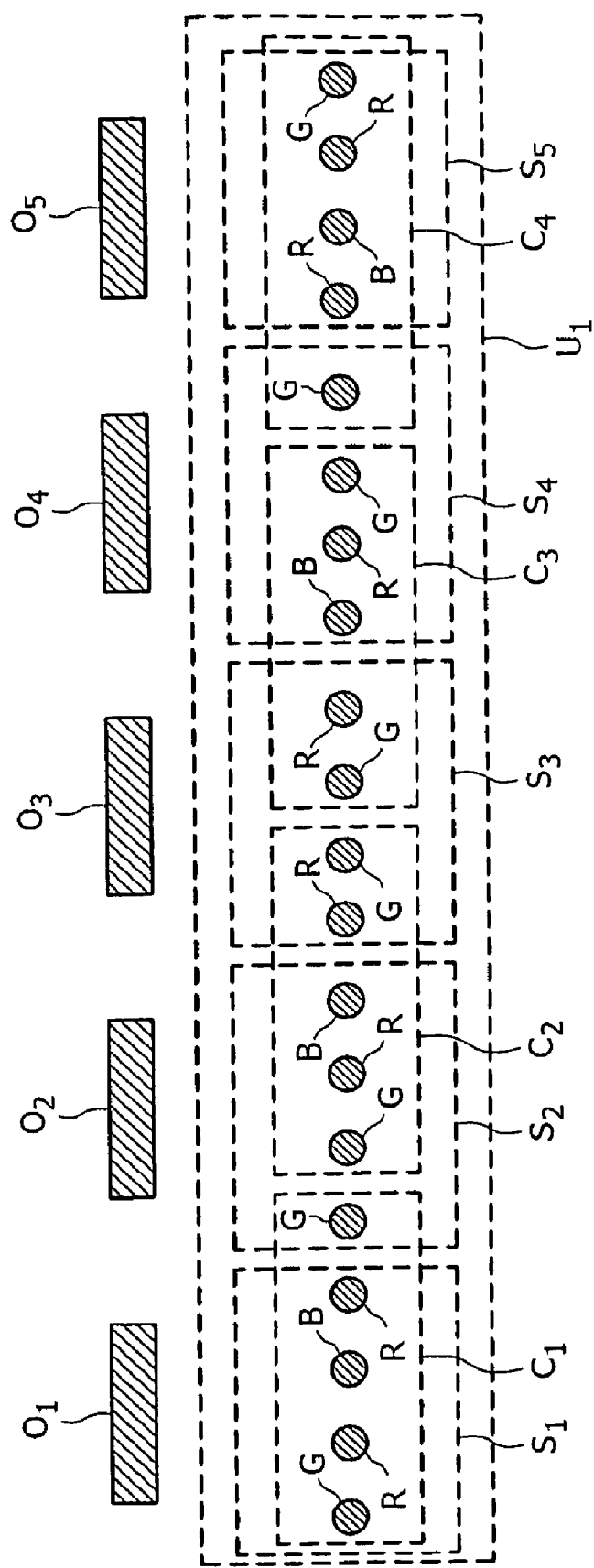
Figure 1N:
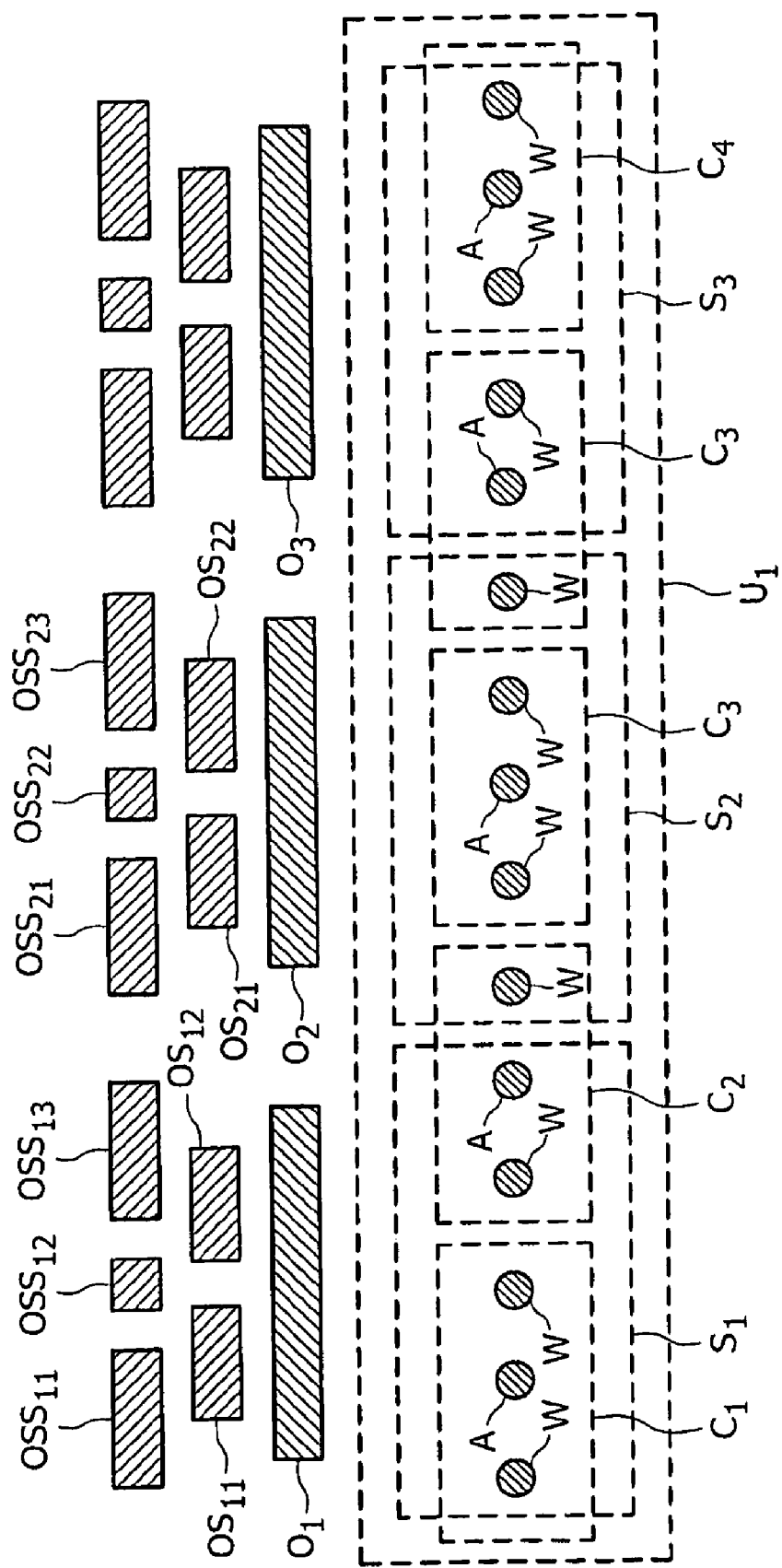
Figure 2:
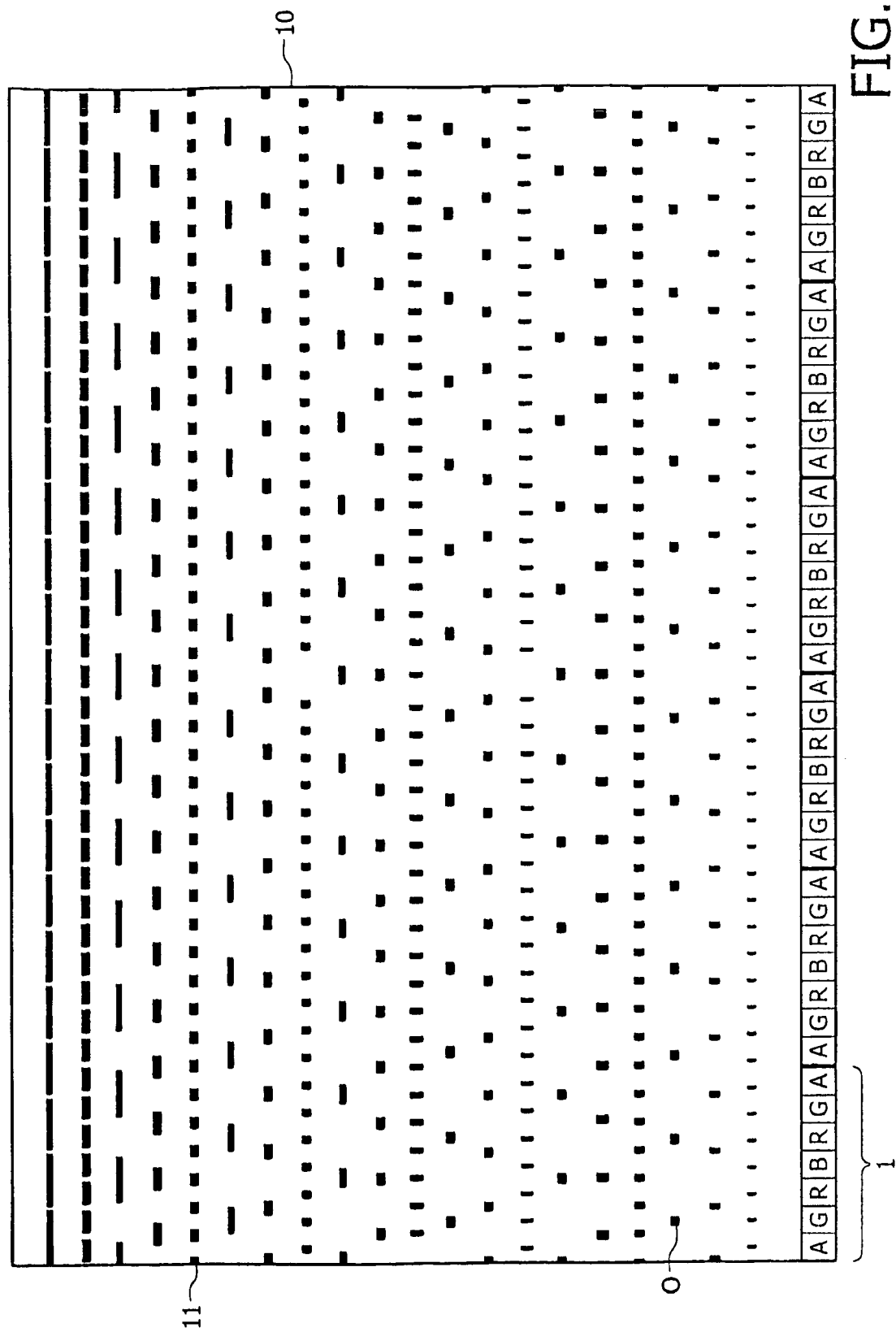

In the drawings:

FIGS. 1A-1N show embodiments of an illumination system according to the invention, FIGS. 1A'-1E' show embodiments of an illumination system corresponding to FIGS. 1A-1E with a different configuration of the outcoupling means, and FIG. 2 shows an embodiment of an illumination system according to the invention with a plurality of linear arrays of outcoupling means.

The Figures are purely diagrammatic and not drawn to scale. Notably, some dimensions are shown in a strongly exaggerated form for the sake of clarity. Similar components in the Figures are denoted as much as possible by the same reference numerals.

FIGS. 1A-1N schematically show embodiments of an illumination system according to the invention. In these Figures the light emitters are indicated with their primary colors. By way of example in each of the FIGS. 1A-1N a different combination of light emitters with two, three or four distinct primary colors is given: "R" representing a light emitter emitting in operation red light; "B" representing a light emitter emitting in operation blue light; "G" representing a light emitter emitting in operation green light; "A" representing a light emitter emitting in operation amber light; "W" representing a light emitter emitting in operation white light. Alternative light emitters with further primary colors may be selected in the illumination system according and may comprise the primary colors "cyan", "yellow", etcetera.

FIGS. 1A'-1E' schematically show embodiments of an illumination system corresponding to FIGS. 1A-1E with a different configuration of the outcoupling means.

All examples shown in FIGS. 1A-1N and FIGS. 1A'-1E' comprise a linear array of light emitters R, G, B, A, W. Preferably, the light emitters R, G, B, A, W are light-emitting diodes (LEDs). In general, the LEDs have a relatively high source brightness. All types of LEDs can be employed in the illumination system according to the invention. In a preferred embodiment, each of the LEDs has a radiant power output of at least 100 mW when driven at nominal power. LEDs having a high output are also referred to as LED power packages. The use of such high-efficiency, high-output LEDs has the specific advantage that, at a desired, comparatively high light output, the number of LEDs may be comparatively small. This has a positive effect on the compactness and on the efficiency of the illumination system to be manufactured.

The linear array of light emitters R, G, B, A, W is associated with at least one linear array of outcoupling means $O_1$, $O_2$, $O_3$, ... for coupling light emitted by the light emitters (R, G, B, A, W) out of the illumination system. Each linear array of outcoupling means $O_1, O_2, O_3, \ldots$ is arranged parallel to the linear array of light emitters R, G, B, A, W. According to the invention, for each linear array of outcoupling means $O_1, O_2, O_3, \ldots$ a configuration of the outcoupling means $O_1, O_2, O_3, \ldots$ and a configuration of the light emitters R, G, B, A, W fulfill the following requirement:

$$N_{CU} \times N_{LC} = N_{OU} \times N_{LO},$$

wherein:

$N_{CU}$ is a number of clusters $C_1, C_2, C_3, \ldots$ per unit $U_1, \ldots,$ $N_{LC}$ is a number of light emitters R, G, B, A, W in each of the clusters $C_1, C_2, C_3, \ldots,$ $N_{OU}$ is a number of outcoupling means $O_1, O_2, O_3, \ldots$ per unit $U_1, \ldots,$ $N_{LO}$ is a number of light emitters per outcoupling means $O_1, O_2, O_3, \ldots.$ In the configuration of the outcoupling means $O_1, O_2, O_3, \ldots$ and the light emitters R, G, B, A, W, a "cluster" $C_1, C_2, C_3, \ldots$ is defined as a smallest repetitive collection of light emitters R, G, B, A, W forming the linear array of light emitters R, G, B, A, W. In addition, each cluster $C_1, C_2, C_3, \ldots$ comprises a plurality of light emitters R, G, B, A, W of at least a first primary color and a second primary color, the second primary color being distinct from the first primary color. Furthermore, a "unit" $U_1, \ldots$ is defined as a smallest number of adjacent clusters repetitive with respect to the outcoupling means $O_1, O_2, O_3, \ldots$ in the at least one linear array of outcoupling means $O_1, O_2, O_3, \ldots$ and with respect to the light emitters R, G, B, A, W.

For clarity reasons only one unit $U_1$ is shown in all the embodiments of the illumination system shown in FIGS. 1B-1N and FIGS. 1B'-1E', while in FIGS. 1A and 1A' for reasons of illustration two adjacent units $U_1$, each consisting of only a single cluster, of this particular embodiment of the illumination system are shown. The outcoupling means in FIGS. 1A'-1E' are referenced $O_1', O_2', O_3', \ldots.$ Preferably, for each linear array of outcoupling means $O_1, O_2, O_3, \ldots; O_1', O_2', O_3', \ldots,$ the number $N_{LCU}$ of light emitters R, G, B, A, W of the same primary color in each unit $U_1, \ldots$ fulfils the requirement:

$$N_{LCU} = i \times N_{LO}, \text{ with } i \in [1, 2, 3, \ldots).$$

In this configuration a "set" $S_1, S_2, S_3, \ldots$ is defined as a collection of $N_{LO}$ adjacent light emitters (R, G, B, A, W) with $$N_{LO} = N_{LU}/N_{OU},$$

and $$N_{LU} = N_{LC} \times N_{CU}.$$

Preferably, the light emitters R, G, B, A, W of the same primary color in each cluster $C_1, C_2, C_3, \ldots$ are distributed on average equally over all available positions in the set $S_1, S_2, S_3, \ldots.$ The above three conditions for the configuration of the outcoupling means $O_1, O_2, O_3, \ldots$ and the light emitters R, G, B, A, W are fulfilled for the embodiments of the illumination system as shown in FIGS. 1A-1N and in FIGS. 1A'-1E'. In particular, $N_{CU}=1$ in FIGS. 1A, 1A', 1D, 1D', 1F, 1I, 1J and 1K, and $N_{CU}>1$ in FIGS. 1B, 1B', 1C, 1C', 1E, 1E', 1G, 1H, 1L, 1M and 1N.

Various preferred configurations are obtained by selecting a constant pitch between the light emitters as well as between the outcoupling means. A relatively high uniform intensity profile with respect to color uniformity and flux distribution is obtained for illumination systems fulfilling the above mentioned conditions. The radiation pattern of the light emitted by the illumination systems as described in the examples is substantially identical for each of the different primary colors at a certain distance from the illumination systems.

Relatively "perfect" solutions are obtained for symmetric clusters of light emitters, where the centre of each outcoupling structure is aligned with the centre of each corresponding set of $N_{LO}$ sources (see the FIGS. 1A-1N), or where the centre of each outcoupling structure is aligned exactly between the centers of two adjacent sets of $N_{LO}$ light sources (see the FIGS. 1A'-1E').

The length of an outcoupling structure may be chosen freely. Preferably, all outcoupling structures are arranged in a line parallel to the light sources and have an identical shape. In addition, an outcoupling structure may be a continuous structure or it may be composed of a number of sub-structures as shown in example (see FIG. 1N). In this FIG. 1N, a single continuous structure $O_1, O_2, O_3, \ldots$ is shown together with two configurations comprising two substructures $OS_{11}, OS_{12}; OS_{21}, OS_{22}; \ldots$ and three substructures $OSS_{11}, OSS_{12}, OSS_{13}; OSS_{21}, OSS_{22}, OSS_{23}; \ldots.$ With reference to FIG. 1N, the number of substructures is referred to as $N_{SS}.$ Table I gives for each of the configurations as shown in FIGS. 1A-1N the number $N_{CU}$ of clusters $C_1, C_2, C_3, \ldots$ per unit $U_1, \ldots,$ the number $N_{LU}$ of light emitters in a unit $U_1, \ldots,$ with $N_{LU}=N_{LC} \times N_{CU},$ the number $N_{OU}$ of outcoupling means $O_1, O_2, O_3, \ldots$ per unit $U_1, \ldots,$ the number $N_{LO}$ of light emitters per outcoupling means $O_1, O_2, O_3, \ldots,$ the number $N_{LCU}$ of light emitters R, G, B, A, W of the same primary color in each unit $U_1, \ldots$ and the number $N_{SS}$ of substructures.

TABLE I

Configurations of the outcoupling means and the light emitters as shown in FIG. 1A-1N.

| | $N_{CU}$ | $N_{LU}$ | $N_{OU}$ | $N_{LO}$ | $N_{LCU}$ | $N_{SS}$ |
|---|---|---|---|---|---|---|
| FIG. 1A | 1 | 3 | 3 | 1 | 1, 2 | 1 |
| FIG. 1B | 2 | 6 | 3 | 2 | 2, 4 | 1 |
| FIG. 1C | 4 | 12 | 3 | 4 | 4, 8 | 1 |
| FIG. 1D | 1 | 4 | 2 | 2 | 2, 2 | 1 |
| FIG. 1E | 3 | 12 | 4 | 3 | 6, 6 | 1 |
| FIG. 1F | 1 | 5 | 5 | 1 | 1, 2, 2 | 1 |
| FIG. 1G | 2 | 10 | 5 | 2 | 2, 4, 4 | 1 |
| FIG. 1H | 3 | 15 | 5 | 3 | 3, 6, 6 | 1 |
| FIG. 1I | 1 | 6 | 3 | 2 | 2, 2, 2 | 1 |
| FIG. 1J | 1 | 8 | 4 | 2 | 2, 2, 2, 2 | 1 |
| FIG. 1K | 1 | 15 | 5 | 3 | 3, 6, 6 | 1 |
| FIG. 1L | 5 | 20 | 4 | 5 | 10, 10 | 1 |
| FIG. 1M | 4 | 20 | 5 | 4 | 4, 8, 8 | 1 |
| FIG. 1N | 5 | 15 | 3 | 5 | 5, 10 | 1, 2, 3 |

FIG. 2 schematically shows an embodiment of an illumination system according to the invention with a plurality of linear arrays of outcoupling means. In particular, the illumination system as shown in FIG. 2 comprises 20 linear arrays of outcoupling means, one of the outcoupling means is referenced O. Repetitive entities 1 of light emitters referenced A (=amber), G (=green), R (=red), and B (=blue) form the linear array of light emitters. In the example of FIG. 2, sides 10, 11 of the linear array of light emitters are oriented substantially perpendicular with respect to the linear array of light emitters and, preferably, are specularly reflective. The configuration of the outcoupling means and a configuration of the light emitters as shown in FIG. 2 results in a substantially uniform intensity profile with respect to color uniformity and flux distribution.

The illumination system may be provided with one or more sensors (not shown in FIG. 2) for measuring one or more optical properties of the light which, in operation, is emitted by the light emitters R, G, B, A, W. Such a sensor may be employed to suitably adapt the luminous flux of the light emitters. By means of the sensor and suitable control electronics, a feedback mechanism can be formed to influence the quality and the quantity of the light emitted by the illumination system. In an alternative embodiment, the illumination system may be provided with a temperature sensor for measuring the temperature of the system, the light emitting devices or some other location in the system. By means of the optical sensor(s), temperature sensor and the control electronics, a feedback and/or feed forward mechanism for influencing the quality and the quantity of the light emitted by the illumination system can be formed.

The conditions as described hereinabove leave the distance between lines with outcoupling means to be chosen freely, as well as the length of the individual outcoupling structures. Preferably, the length $L_O$ of the individual outcoupling structures meets the following (boundary) condition:

$$L_O > N_{LO} \times P,$$

wherein $L_O$ is the length of the individual outcoupling means associated with a set, $N_{LO}$ is the total number of light emitters in a set of light emitters in the illumination system and P is the pitch between the light emitters.

For a given light source configuration, various configurations of slits may be combined in the tile, where a single configuration of outcoupling structures is used per line (depending on the options that are possible given the previously defined conditions), e.g. the combination of configurations as shown in FIGS. 1E, 1E', 1D and 1D', or as shown in FIGS. 1F, 1G and 1H.

In principle, numerous combinations of different units, with respect to size as well as with respect to configuration, are possible. For ideal solutions a very favorable condition is that one and the same configuration of outcoupling means within a line parallel to the array of light emitters is used for different units that the light emitter array can be composed of. In such case, above-mentioned conditions have to be met with the same $N_{LO}$ for all different units. Examples are the combinations as shown in FIGS. 1G and 1J and as shown in FIGS. 1E and 1H. Preferably, in this case of an array of light emitters that is composed of different units of light emitters with respect to size and/or configuration, the above mentioned condition holds for all the arrays of outcoupling means in combination with the common array of light emitters.

The preferred conditions as mentioned hereinabove result in nearly perfect and practically ideal solutions. In practical life many near-optimal configurations will also be acceptable. Such near-optimal configurations include the favorable class of slit configurations that fulfill the conditions but that are used with asymmetric clusters of light sources. A slight color artifact is expected at the extremes of the array of light sources, but this may be negligible. A second class of near-optimal configuration is obtained by changing the slit configuration in a line parallel to the light source array (e.g. together with a change in the units).

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An illumination system comprising:
a linear array of light emitters (R, G, B, A, W) associated with at least one linear array of outcoupling means ($O_1$, $O_2$, $O_3$, ...) for coupling light emitted by the light emitters (R, G, B, A, W) out of the illumination system, each linear array of outcoupling means ($O_1$, $O_2$, $O_3$, ...) being arranged parallel to the linear array of light emitters (R, G, B, A, W),
for each linear array of outcoupling means ($O_1$, $O_2$, $O_3$, ...), a configuration of the outcoupling means ($O_1$, $O_2$, $O_3$, ...) and a configuration of the light emitters (R, G, B, A, W) fulfilling the requirement:

$$N_{CU} \times N_{LC} = N_{OU} \times N_{LO},$$

wherein
$N_{CU}$ is a number of clusters ($C_1$, $C_2$, $C_3$, ...) per unit ($U_1$, ...),
$N_{LC}$ is a number of light emitters (R, G, B, A, W) in each of the clusters ($C_1$, $C_2$, $C_3$, ...),
$N_{OU}$ is a number of outcoupling means ($O_1$, $O_2$, $O_3$, ...) per unit ($U_1$, ...),
$N_{LO}$ is a number of light emitters per outcoupling means ($O_1$, $O_2$, $O_3$, ...),
wherein
a "cluster" ($C_1$, $C_2$, $C_3$, ...) is a smallest repetitive collection of light emitters (R, G, B, A, W) forming the linear array of light emitters (R, G, B, A, W),
each cluster ($C_1$, $C_2$, $C_3$, ...) comprises a plurality of light emitters (R, G, B, A, W) of at least a first primary color and a second primary color, the second primary color being distinct from the first primary color, and
a "unit" ($U_1$, ...) is a smallest number of adjacent clusters repetitive with respect to the outcoupling means ($O_1$, $O_2$, $O_3$, ...) in the at least one linear array of outcoupling means ($O_1$, $O_2$, $O_3$, ...) and with respect to the light emitters (R, G, B, A, W).

2. An illumination system as claimed in claim 1, wherein, for each linear array of outcoupling means ($O_1$, $O_2$, $O_3$, ...), the number $N_{LCU}$ of light emitters (R, G, B, A, W) of the same primary color in each unit ($U_1$, $U_2$, $U_3$, ...) fulfils the requirement:

$$N_{LCU} = i \times N_{LO}, \text{ with } i \in [1, 2, 3, \ldots),$$

wherein a "set" ($S_1$, $S_2$, $S_3$, ...) is a collection of $N_{LO}$ adjacent light emitters (R, G, B, A, W) with $$N_{LO} = N_{LU}/N_{OU},$$

and $$N_{LU} = N_{LC} \times N_{CU}.$$

3. An illumination system as claimed in claim 2, wherein the light emitters (R, G, B, A, W) of the same primary color in each cluster ($C_1$, $C_2$, $C_3$, ...) are distributed on average equally over all available positions in the set ($S_1$, $S_2$, $S_3$, ...).

4. An illumination system as claimed in claim 1, wherein the pitch between the light emitters (R, G, B, A, W) is constant.

5. An illumination system as claimed in claim 2, wherein each outcoupling means ($O_1$, $O_2$, $O_3$, ...) comprises a continuous structure.

6. An illumination system as claimed in claim 5, wherein the pitch between the outcoupling means ($O_1$, $O_2$, $O_3$, ...) is constant.

7. An illumination system as claimed in claim 5, wherein each outcoupling means ($O_1$, $O_2$, $O_3$, ...) is symmetrical with respect to a center of the outcoupling means ($O_1$, $O_2$, $O_3$, ...).

8. An illumination system as claimed in claim 7, wherein the centre of each outcoupling means ($O_1$, $O_2$, $O_3$, ...) is aligned with a centre of each corresponding set of $N_{LO}$ light emitters (R, G, B, A, W).

9. An illumination system as claimed in claim 8, wherein the centre of each outcoupling means ($O_1$, $O_2$, $O_3$, ...) is aligned between centers of two adjacent sets of $N_{LO}$ light emitters (R, G, B, A, W).

10. An illumination system as claimed in claim 2, wherein each unit ($U_1$, ...) consists of a single cluster ($C_1$, $C_2$, $C_3$, ...) and each cluster ($C_1$, $C_2$, $C_3$, ...) comprises an even number of light emitters (R, G, B, A, W) and is associated with an even number of outcoupling means ($O_1$, $O_2$, $O_3$, ...), and wherein:

$$N_{LCC} = i \times j \times N_{LO}, i\epsilon[1, 2, 3, ...),$$

wherein:
j=1 in case $N_{LO}$ is even, and
j=2 in case $N_{LO}$ is odd.

11. An illumination system as claimed in claim 2, wherein each unit ($U_1$, $U_2$, $U_3$, ...) consists of a single cluster ($C_1$) and each cluster ($C_1$) comprises an odd number of light emitters (R, G, B, A, W) and is associated with an odd number of outcoupling means ($O_1$, $O_2$, $O_3$, ...), and wherein:

$$N_{LCC} = [(2 \times i) + j] \times N_{LO}, i\epsilon[0, 1, 2, ...),$$

wherein:
j=1 for one of the primary colors, and
j=0 for the other primary colors.

12. An illumination system as claimed in claim 1, wherein each unit ($U_1$, $U_2$, $U_3$, ...) consists of at least two clusters ($C_1$, $C_2$, $C_3$, ...).

13. An illumination system as claimed in claim 1, wherein each outcoupling means ($O_1$, $O_2$, $O_3$, ...) comprises a pre-determined number of discrete sub-structures ($OS_{11}$, $OS_{12}$; $OS_{21}$, $OS_{22}$; ...; $OSS_{11}$, $OSS_{12}$, $OSS_{13}$; $OSS_{21}$, $OSS_{22}$, $OSS_{23}$; ...).

14. An illumination system as claimed in claim 1, wherein each cluster ($C_1$, $C_2$, $C_3$, ...) comprises at least one light emitter (R, G, B, A, W) of a third primary color, the third primary color being distinct from the first and the second primary color.

15. An illumination system as claimed in claim 1, wherein the light emitters (R, G, B, A, W) in each cluster ($C_1$, $C_2$, $C_3$, ...) are arranged symmetrical with respect to the distribution of the primary colors.

16. An illumination system as claimed in claim 1, wherein sides (10, 11) of the linear array of light emitters (R, G, B, A, W) are oriented substantially perpendicular with respect to the linear array of light emitters (R, G, B, A, W) and are specularly reflective.

17. An illumination system as claimed in claim 1, wherein the illumination system comprises optical and/or thermal sensors and electronic control means forming a feed back and/or feed forward system for controlling the quality and/or quantity of the light emitted by the illumination system.

* * * * *